United States Patent
Kim et al.

(10) Patent No.: US 8,913,469 B2
(45) Date of Patent: Dec. 16, 2014

(54) OPTICAL INFORMATION STORAGE MEDIUM SYSTEM AND METHOD OF GENERATING SIGNAL FOR CONTROLLING LIGHT POWER

(75) Inventors: Hong-kuk Kim, Seoul (KR); Jong-hwa Yu, Yongin-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 211 days.

(21) Appl. No.: 13/289,376

(22) Filed: Nov. 4, 2011

(65) Prior Publication Data
US 2012/0113774 A1 May 10, 2012

(30) Foreign Application Priority Data
Nov. 4, 2010 (KR) .................. 10-2010-0109278

(51) Int. Cl.
*G02F 1/13* (2006.01)
*G11B 7/00* (2006.01)
*G11B 7/0045* (2006.01)
*G11B 7/1263* (2012.01)

(52) U.S. Cl.
CPC .................. *G11B 7/1263* (2013.01)
USPC ............... 369/44.29; 369/53.27; 369/116

(58) Field of Classification Search
USPC ............. 372/38.02; 369/44.11, 116, 53.26, 369/53.27, 120, 124.01, 124.1–124.12
See application file for complete search history.

(56) References Cited

U.S. PATENT DOCUMENTS

| | | | | |
|---|---|---|---|---|
| 5,067,122 | A * | 11/1991 | McGee | 369/116 |
| 6,768,091 | B2 * | 7/2004 | Yamamoto et al. | 250/201.5 |
| 7,177,253 | B2 * | 2/2007 | Ishibashi et al. | 369/53.27 |
| 7,636,286 | B2 | 12/2009 | Lee et al. | |
| 7,839,746 | B2 * | 11/2010 | Shimakawa | 369/53.26 |
| 2004/0125724 | A1 * | 7/2004 | Miyake | 369/53.27 |
| 2008/0056086 | A1 * | 3/2008 | Kuroda | 369/53.26 |
| 2012/0008478 | A1 * | 1/2012 | Minamiguchi et al. | 369/53.26 |

FOREIGN PATENT DOCUMENTS

| | | |
|---|---|---|
| JP | 2003-187439 | 7/2003 |
| JP | 2004-071084 | 3/2004 |
| KR | 10-0556424 | 3/2006 |
| KR | 10-2008-0083090 | 9/2008 |

* cited by examiner

*Primary Examiner* — Wayne Young
*Assistant Examiner* — Dionne Pendleton
(74) *Attorney, Agent, or Firm* — NSIP Law

(57) ABSTRACT

An optical information storage medium system is provided. The optical information storage medium system includes an optical pickup, which comprises a photo-detector configured to control light power detected by receiving a portion of light emitted from a light source and obtains an output signal proportional to output light power of the light source from a signal detected by the photo-detector, and a signal processor configured to signal-process the output signal input from the optical pickup. The signal processor includes a sensitivity acquisition unit configured to acquire a sensitivity value of the photo-detector, a gain calculator configured to calculate a target gain value to be used in comparing the sensitivity value of the photo-detector, which is acquired by the sensitivity acquisition unit, with a target sensitivity value to be used by the optical information storage medium system, and a gain adjustment unit.

20 Claims, 4 Drawing Sheets

OPTICAL INFORMATION STORAGE MEDIUM SYSTEM AND METHOD OF GENERATING SIGNAL FOR CONTROLLING LIGHT POWER

CROSS-REFERENCE TO RELATED PATENT APPLICATION

This application claims the benefit under 35 U.S.C. §119 (a) of Korean Patent Application No. 10-2010-0109278, filed on Nov. 4, 2010, in the Korean Intellectual Property Office, the entire disclosure of which is incorporated herein by reference for all purposes.

BACKGROUND

1. Field of the Invention

The following disclosure relates to an optical information storage medium system and a method of generating a signal for controlling light power.

2. Description of the Related Art

An optical pickup is used for recording or reproducing of an optical information storage medium, such as a Digital Versatile Disc (DVD), a Compact Disc (CD), or a Blu-ray Disc (BD). An optical information storage medium system, for example, an optical recording device such as an optical disc drive, having the optical pickup performs a recording, reproducing, or erasing operation by focusing light emitted from a laser diode onto an optical information storage medium by using an objective lens. The laser diode is a light source. In such an optical information storage medium system, proper light power must be maintained for exact recording, and output power of a light source needs to be controlled based on a write strategy. The write strategy is an algorithm for recording.

A component used in an optical pickup controls the output power of a light source. The component may be a Front Photo-Detector (FPD) or a Monitoring Photo-Detector (MPD).

Generally, an optical pickup uses an optical divider, such as a beam splitter, to divide a light beam incident to an objective lens, provide some of the divided light beams to a FPD, monitor output light power of a light source in the optical pickup based on the intensity of the light beams incident to the FPD, and control light power emitted from the light source by sending a result of the monitoring back to an optical power controller.

In optical information storage medium systems, in order to improve performance, sensitivity of an output of an FPD is adjusted by adjusting light power. Thus, a Variable Resistor (VR) or a Digital PotentioMeter (DPM) may be used to adjust the output sensitivity.

That is, when light emitted from a light source is converted to an electrical signal by an FPD, a level of the electrical signal may be adjusted to a specific target level by adjusting a gain of an amplifier. The amplifier may be an operational amplifier (OP-Amp), and a VR may be used to adjust the gain. When an output of the FPD, which has been adjusted to the target level, is provided to a Digital Signal Processor (DSP), light power may be adjusted and used based on the adjusted output of the FPD.

Therefore, a separate device, such as a VR, or an expensive FPD including a DPM may be used.

In addition, in such an optical information storage medium system, a separate component must be used to adjust the sensitivity to a target sensitivity, and an adjusted value must be used as it is, so usable signal sensitivity is inevitably limited.

SUMMARY

According to an aspect, an optical information storage medium system is provided. The optical information storage medium system includes an optical pickup, which comprises a photo-detector configured to control light power detected by receiving a portion of light emitted from a light source and obtains an output signal proportional to output light power of the light source from a signal detected by the photo-detector; and a signal processor configured to signal-process the output signal input from the optical pickup. The signal processor includes a sensitivity acquisition unit configured to acquire a sensitivity value of the photo-detector, a gain calculator configured to calculate a target gain value to be used in comparing the sensitivity value of the photo-detector, which is acquired by the sensitivity acquisition unit, with a target sensitivity value to be used by the optical information storage medium system, and a gain adjustment unit configured to adjust a gain of an output signal of the photo-detector, which is input from the optical pickup, based on the target gain value, and the signal processor generates an output signal to which the gain is reflected.

The optical pickup may include a sensitivity recording unit in which a value obtained by pre-measuring sensitivity of the photo-detector is recorded, and the sensitivity acquisition unit may acquire the sensitivity value of the photo-detector from information provided by the sensitivity recording unit.

In the sensitivity recording unit, the sensitivity value of the photo-detector may be recorded as barcode data.

The sensitivity acquisition unit may acquire the sensitivity value of the photo-detector by using the output signal output from the optical pickup.

The signal processor may be implemented with a digital signal processor.

The signal detected by the photo-detector may be output as an output signal of the optical pickup by passing through a fixed resistor configured to set the sensitivity of the photo-detector.

In another aspect, an optical information storage medium system is provided. The optical information storage medium system includes an optical pickup, which comprises a photo-detector configured to control light power detected by receiving a portion of light emitted from a light source and obtains an output signal proportional to output light power of the light source from a signal detected by the photo-detector and a sensitivity recording unit in which a value obtained by pre-measuring sensitivity of the photo-detector is recorded, and a signal processor configured to signal-process the output signal input from the optical pickup. The signal detected by the photo-detector is output as an output signal of the optical pickup by passing through a fixed resistor for setting the sensitivity of the photo-detector. The signal processor includes a sensitivity acquisition unit configured to acquire a sensitivity value of the photo-detector from information provided by the sensitivity recording unit, a gain calculator configured to calculate a target gain value to be used by comparing the sensitivity value of the photo-detector, which is acquired by the sensitivity acquisition unit, with a target sensitivity value to be used by the optical information storage medium system, and a gain adjustment unit configured to adjust a gain of an output signal of the photo-detector, which is input from the optical pickup, based on the target gain value, and the signal processor generates an output signal to which the gain is reflected.

In yet another aspect, a method of generating a signal for controlling light power is provided. The method includes obtaining an output signal proportional to output light power of a light source from a signal detected by a photo-detector in an optical pickup, which comprises the photo-detector configured to control light power detected by receiving a portion of light emitted from the light source in order to generate the signal to control the light power in an optical information storage medium system comprising the optical pickup and a signal processor, acquiring a sensitivity value of the photo-detector, calculating a target gain value to be used by comparing the acquired sensitivity value of the photo-detector with a target sensitivity value to be used by the optical information storage medium system, and generating an output signal for a light power control to which the gain is reflected by adjusting a gain of an output signal of the photo-detector, which is input from the optical pickup, by using the target gain value. The signal processor is configured to perform the acquiring of the sensitivity value, the calculating of the target gain value, and the generating of the output signal for a light power control to which the gain is reflected.

A value obtained by pre-measuring sensitivity of the photo-detector may be recorded in the optical pickup, and the sensitivity value of the photo-detector is acquired from the value obtained by pre-measuring the sensitivity of the photo-detector.

The signal processor may be implemented with a digital signal processor.

The sensitivity value of the photo-detector may be acquired based on the output signal output from the optical pickup.

The signal detected by the photo-detector may be output as an output signal of the optical pickup by passing through a fixed resistor configured to set the sensitivity of the photo-detector.

The signal processor may be implemented with a digital signal processor.

Other features and aspects may be apparent from the following detailed description, the drawings, and the claims.

Figure 1:
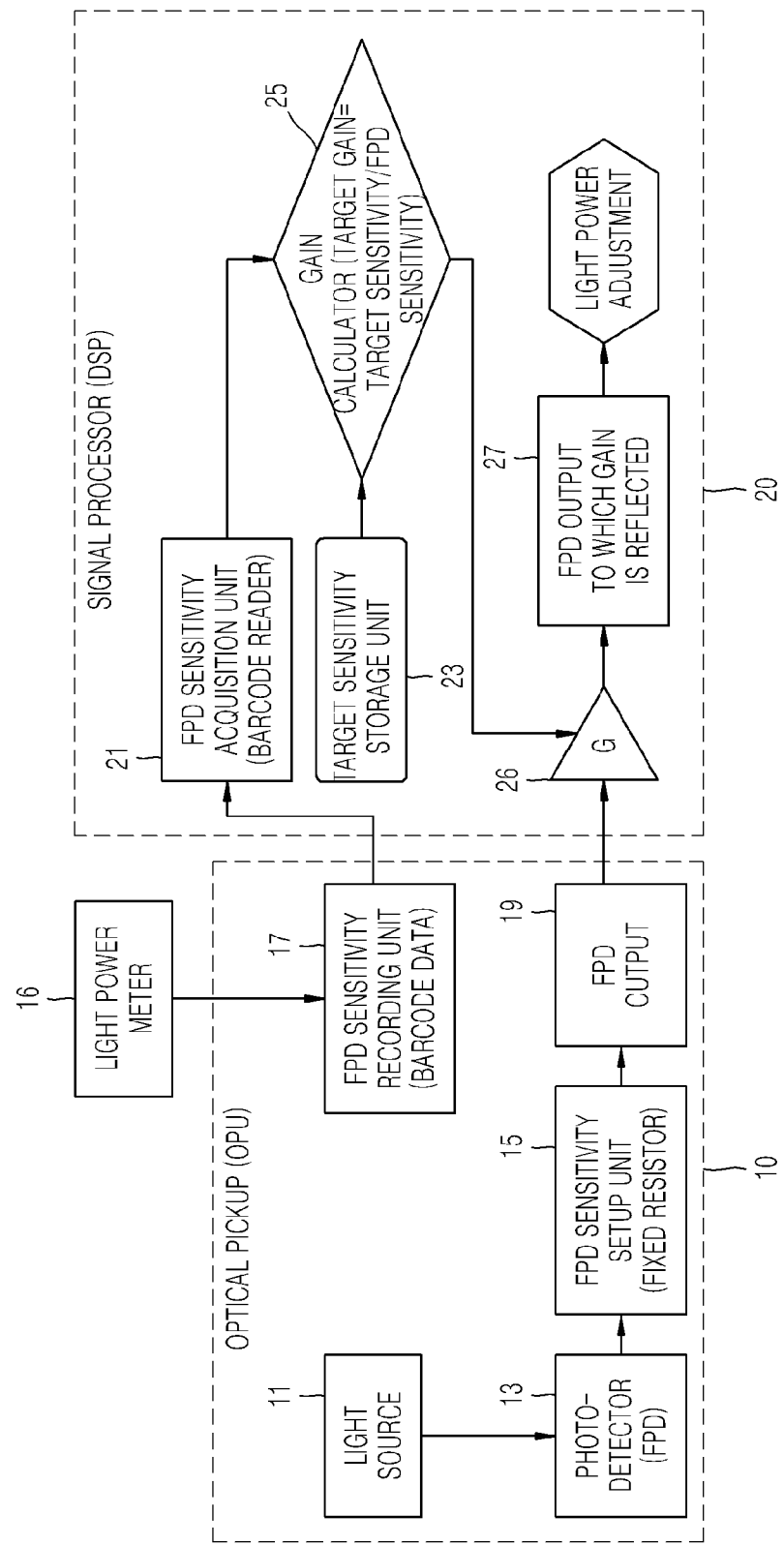
FIG. 1 is a diagram illustrating an example of an optical information storage medium system and a method of generating a signal for controlling light power.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

According to an optical information storage medium system and a method of generating a signal for controlling light power, a sensitivity adjustment function of a photo-detector for controlling light power, which is performed by an optical pickup, is performed by a signal processor such as a Digital Signal Processor (DSP). The signal processor may include a sensitivity acquisition unit for acquiring sensitivity information from information input from the optical pickup, a target sensitivity setup unit for setting target sensitivity to be used by the optical information storage medium system, a gain calculator for calculating a gain based on a comparison of the sensitivity information and the target sensitivity, and a gain adjustment unit for amplifying a signal output by the photo-detector based on the calculated gain to control light power. The light power is input from the optical pickup.

FIG. 1 illustrates an example of an optical information storage medium system and a method of generating a signal for controlling light power.

Referring to FIG. 1, the optical information storage medium system includes an optical pickup (OPU) 10 for outputting an output signal proportional to output light power of a light source 11 and a signal processor 20 for signal-processing the output signal output by the OPU 10.

The OPU 10 includes the light source 11 and a photo-detector 13. The photo-detector 13 controls light power detecting by receiving a portion of light emitted from the light source 11. The OPU 10 obtains the output signal proportional to the output light power of the light source 11 from a signal detected by the photo-detector 13. The photo-detector 13 is referred to as a Front Photo-Detector (FPD) or a Digital PotentioMeter (DPM) and relates to 'FPD.' Hereinafter, the photo-detector 13 is referred to as an FPD 13 to differentiate the photo-detector 13 from a photo-detector used to detect an information reproduction signal or a servo signal.

An optical system forming the OPU 10 includes the light source 11, an optical path changer (not shown), such as a beam splitter, for changing a traveling path of incident light, an objective lens (not shown), a photo-detector (not shown) for detecting an information reproduction signal or a servo signal, and the FPD 13 for monitoring a light output amount of the light source 11. The FPD 13 detects a light amount proportional to the output light power of the light source 11 by, for example, receiving a portion of light emitted by the light source 11 and the portion of light is split by the optical path changer. Since structures of the optical system are understood by one of ordinary skill, a drawing and detailed description thereof are omitted for conciseness.

As shown in FIG. 1, the OPU 10 may further include a sensitivity setup unit 15 for setting sensitivity of the FPD 13 and a sensitivity recording unit 17. The sensitivity setup unit 15 may be located so that a signal detected by the FPD 13 is output as an output signal, i.e., an output signal of the FPD 13. The output signal of the FPD 13 is then output by an output end 19 of the OPU 10 after passing through the sensitivity setup unit 15. The sensitivity setup unit 15 may be implemented with a fixed resistor. In another example, the FPD 13 may be designed so that a sensitivity setup unit, such as a fixed resistor, is excluded, instead of being designed to include the sensitivity setup unit 15 implemented with a fixed resistor. The sensitivity recording unit 17 may record sensitivity of the FPD 13 as barcode data. The sensitivity recording unit 17 may pre-measure sensitivity of the FPD 13 by using an optical power meter 16, and record the pre-measured sensitivity value as barcode data.

Unlike the conventional art in which a variable resistor (VR) or a DPM is included in an OPU is used to adjust sensitivity of an FPD, according to the optical information storage medium system, sensitivity of the FPD 13 may be set based on a fixed resistor, and the signal processor 20 performs functions that adjust sensitivity of the FPD 13.

The signal processor 20 may include a gain adjustment unit 26 for adjusting a gain, a sensitivity acquisition unit 21 for obtaining a sensitivity value by reading sensitivity of the FPD 13, and a gain calculator 25 for calculating a target gain value. The sensitivity acquisition unit 21 for obtaining the sensitivity value of the FPD 13 may be provided by the OPU 10. In the optical information storage medium system, the signal processor 20 may be implemented using a DSP.

As shown in FIG. 1, in response to sensitivity data of the FPD 13 being recorded as, for example, barcode data in the OPU 10, the sensitivity acquisition unit 21 may obtain the sensitivity value of the FPD 13 by receiving barcode-read information from the OPU 10.

A target sensitivity to be used by the optical information storage medium system may be stored in a target sensitivity storage unit 23, and the gain calculator 25 may calculate the target gain value to be used based on a comparison of the sensitivity value of the FPD 13, which may be obtained by the sensitivity acquisition unit 21, and the target sensitivity. The target gain value may be related to, for example, a ratio of the target sensitivity to the sensitivity value of the FPD 13.

The gain adjustment unit 26 adjusts a gain G of the output signal of the FPD 13 based on the target gain value obtained by the gain calculator 25. The output signal input to the gain adjustment unit 26 is inputted from the output end 19 of the OPU 10. After the gain G is set in an initial adjustment of the gain adjustment unit 26, the optical information storage medium system may use the gain G. An output signal in which the generated gain G is reflected may be converted to a signal amplified corresponding with a gain desired in the optical information storage medium system. The amplified signal may be used by the signal processor 20. One of the benefits of the optical information storage medium system is an improvement in resolution, where the resolution has been degraded by low sensitivity of the FPD 13.

The output signal in which the generated gain G is adjusted may be output by an output end 27 of the signal processor 20. The output signal of the output end 27 may be used to adjust output light power of the light source 11. Based on the output signal of the FPD 13 to which the gain G is reflected, a current applied to the light source 11 of the OPU 10 from a light power controller (not shown) may be adjusted. Accordingly, light adjusted to a desired light power may be emitted from the light source 11.

Figure 2:
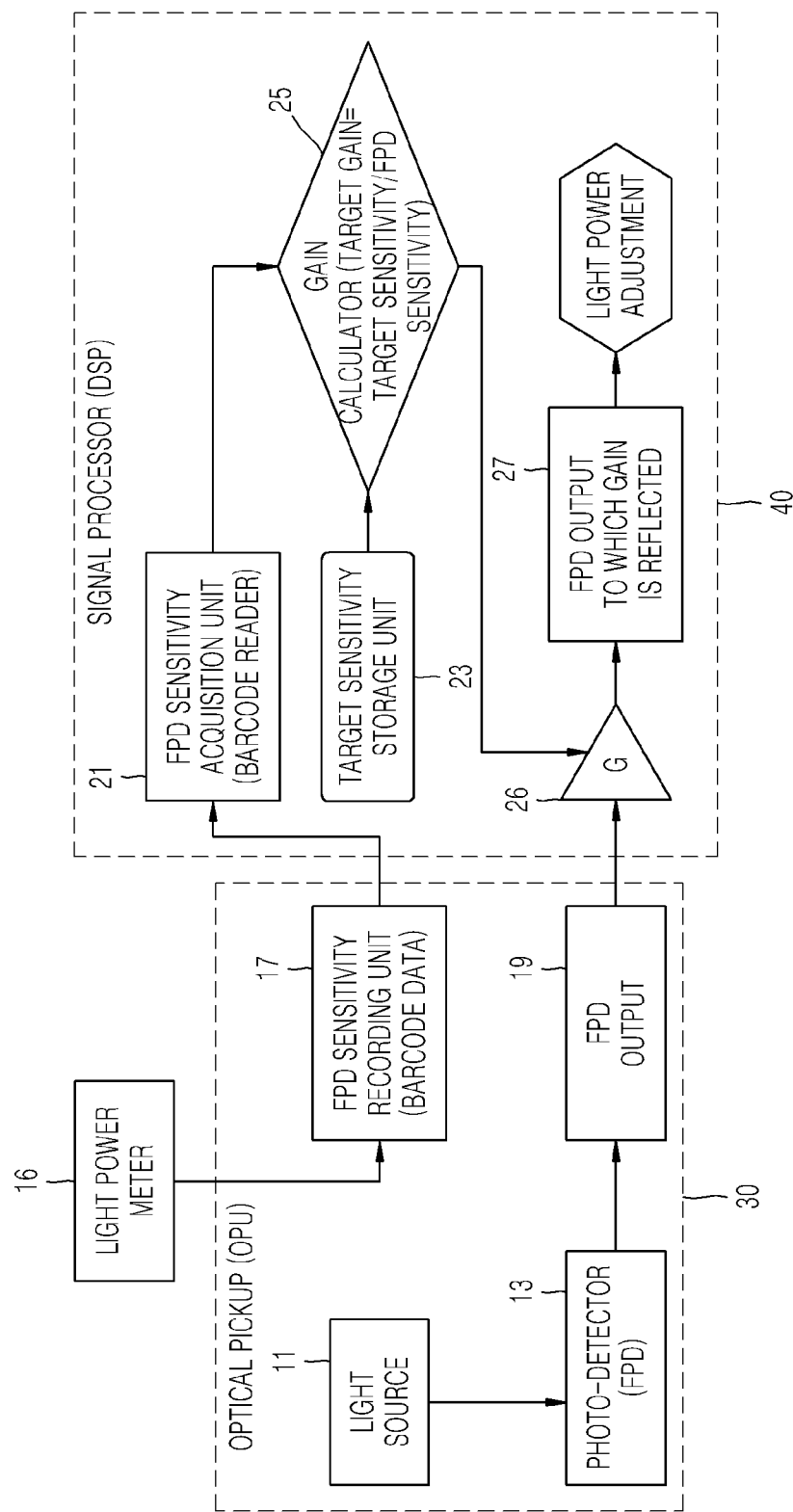
FIG. 2 is a diagram illustrating another example of an optical information storage medium system and a method of generating a signal for controlling light power.

FIG. 2 illustrates another example of an optical information storage medium system and a method of generating a signal for controlling light power. In this example, the optical information storage medium system may include an OPU 30 and a signal processor 40. Substantially the same elements as in FIG. 1 are referred to by the same reference numerals, and thus the descriptions thereof are omitted for conciseness.

In comparison, with the OPU 10 of FIG. 1, the OPU 30 excludes the fixed resistor (15 of FIG. 1) for setting the sensitivity of the FPD 13, and the signal processor 40 has substantially the same configuration and operation as the signal processor 20 of FIG. 1.

When the FPD 13 is designed so that a sensitivity setup unit, such as a fixed resistor, is excluded, as shown in FIG. 2, the OPU 30 may be configured to exclude a sensitivity setup unit, such as a fixed resistor, of the FPD 13.

Figure 3:
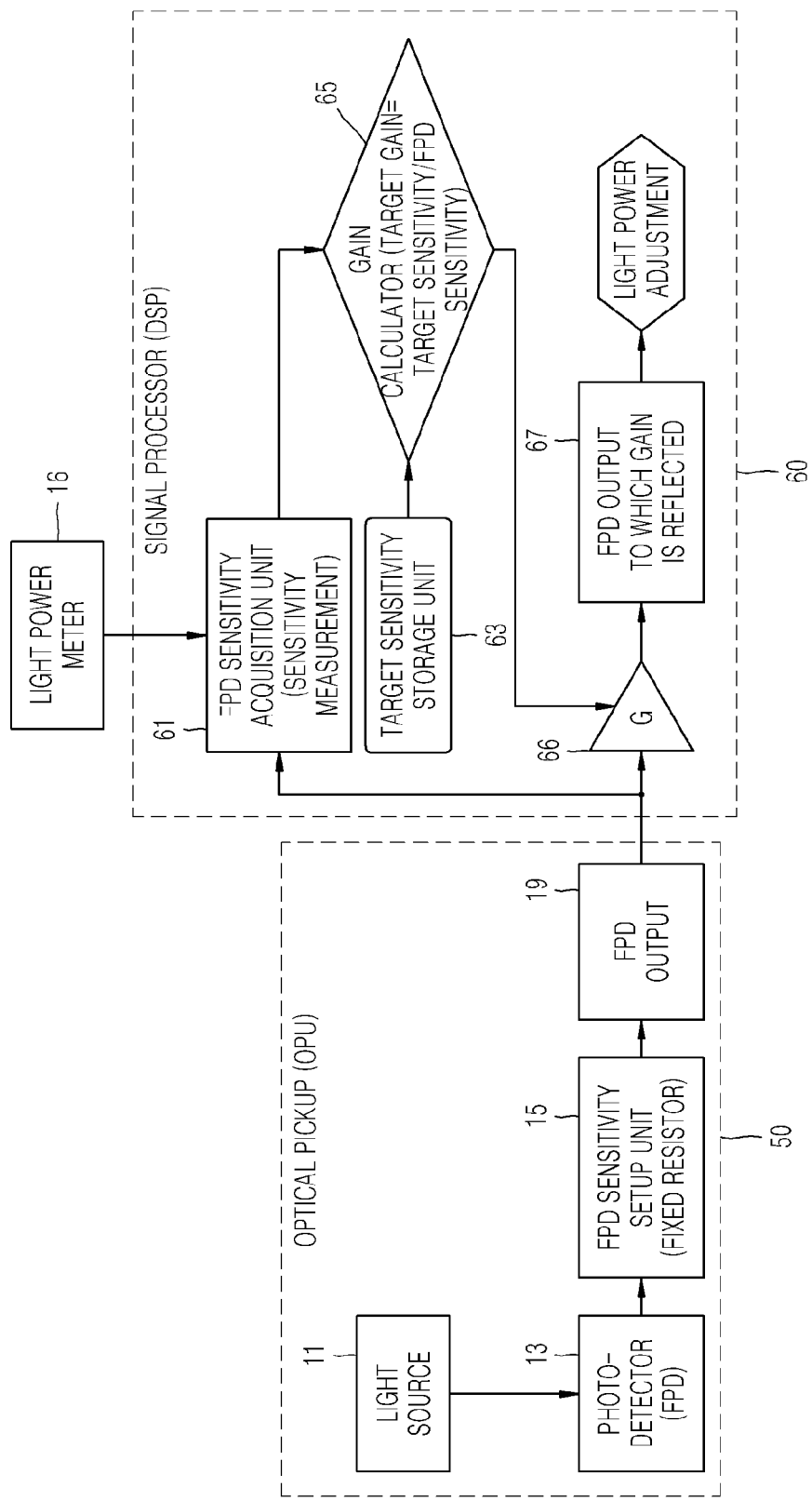
FIG. 3 is a diagram illustrating yet another example of an optical information storage medium system and a method of generating a signal for controlling light power.

FIG. 3 illustrates another example of an optical information storage medium system and a method of generating a signal for controlling light power. In this example, the optical information storage medium system includes an OPU 50 and a signal processor 60. Substantially the same elements as in FIG. 1 are referred to by the same reference numerals, and thus descriptions thereof are omitted for conciseness.

In comparison with the OPU 10 of FIG. 1, the OPU 50 excludes a sensitivity recording unit (17 of FIG. 1) for recording the sensitivity of the FPD 13 as barcode data, and the output signal, i.e., the output signal of the FPD 13, output by the output end 19 of the OPU 10. The output signal of the FPD 13 has been detected by the FPD 13 and has passed through the fixed resistor 15, is input to a gain adjustment unit 66 of the signal processor 60 and a sensitivity acquisition unit 61 of the signal processor 60. The rest of the configuration of the OPU 50 of FIG. 3 is similar to the OPU 10 of FIG. 1.

The signal processor 60 may include the sensitivity acquisition unit 61 for obtaining a sensitivity value of the FPD 13, a gain calculator 65 for calculating a target gain value, and the gain adjustment unit 66 for adjusting a gain. In the example of the optical information storage medium system, the signal processor 60 may also be implemented with a DSP.

As shown in FIG. 3, when the sensitivity value of the FPD 13 is obtained by using the output signal of the FPD 13 output by the output end 19, the sensitivity acquisition unit 61 may obtain a sensitivity measurement value. The sensitivity measurement value may be obtained by, for example, dividing the output signal of the FPD 13 by a light power output value. The output signal of the FPD 13 may be obtained from the OPU 50. The sensitivity measurement value of the FPD 13 is measured based on the light power output value of the light source 11. The light power output value of the light source 11 is directly measured by the optical power meter 16 in an assembly line.

Target sensitivity to be used by the optical information storage medium system may be stored in a target sensitivity storage unit 63, and the gain calculator 65 may calculate the target gain value to be used based on the sensitivity value of the FPD 13 with the target sensitivity. The sensitivity value may be obtained from the sensitivity acquisition unit 61. The target gain value may relate to, for example, a ratio of the target sensitivity to the sensitivity value of the FPD 13.

The gain adjustment unit 66 adjusts a gain G of the output signal of the FPD 13, which is input from the output end 19 of the OPU 50, based on the target gain value obtained by the gain calculator 65. After the gain G is set in an initial adjustment of the gain adjustment unit 66, the optical information storage medium system may use the gain G. An output signal to which the generated gain G is reflected may be converted to a signal amplified corresponding with a gain desired in the optical information storage medium system and used by the signal processor 60. One of the benefits of the optical information storage medium system is to improve resolution where the resolution has been degraded due to low sensitivity of the FPD 13.

The output signal to which the generated gain G is reflected is output by an output end 67 of the signal processor 60. The reflected output signal may be used to adjust output light power of the light source 11. Based on the output signal of the FPD 13 to which the gain G is reflected, a current applied to the light source 11 of the OPU 50 from a light power controller (not shown) may be adjusted, and accordingly, light adjusted to desired light power may be emitted from the light source 11.

A signal for controlling light power in the examples of the optical information storage medium systems may be generated through the following process.

A portion of light emitted from the light source 11 may be detected by the FPD 13, and the FPD 13 generates a detection signal. The OPU 10, 30, or 50 may obtain an output signal proportional to output light power of the light source 11 from the detection signal of the FPD 13. The output signal is a signal, which has passed through the sensitivity setup unit 15 including an element, such as a fixed resistor, as shown in FIGS. 1 and 3, or a signal not passing through such a sensitivity setup unit when the FPD 13 is designed so that a sensitivity setup unit, such as a fixed resistor, is excluded as shown in FIG. 2. The signal processor 20, 40, or 60 may obtain a sensitivity value of the FPD 13 and calculates a target gain value to be used based on a comparison of the sensitivity value of the FPD 13 with a target sensitivity value to be used by an optical information storage medium system. The signal processor 20, 40, or 60 may also generate an output signal for controlling light power to which a gain is reflected based on adjusting the gain to the target gain value for the output signal of the FPD 13, which is input from the OPU 10, 30, or 50. The sensitivity value of the FPD 13 may be obtained from a value recorded as, for example, barcode data by pre-measuring sensitivity of the FPD 13, as shown in FIGS. 1 and 2, or obtained based on the output signal output from the OPU 10, 30, or 50, as shown in FIG. 3.

Figure 4:
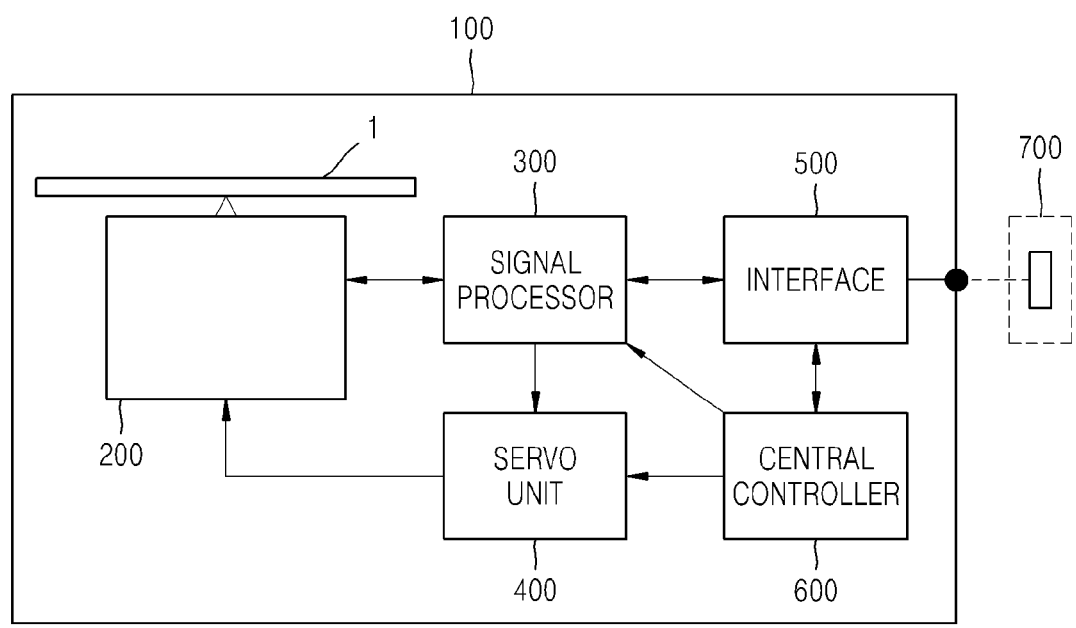
FIG. 4 is a diagram illustrating an example of an optical information storage medium system.

FIG. 4 illustrates an example of an optical information storage medium system 100.

Referring to FIG. 4, the optical information storage medium system 100 includes an optical pickup 200 movably installed in a radius direction of an optical information storage medium 1 to reproduce information recorded on the optical information storage medium 1 or record information thereto and a controller 600 for controlling the optical pickup 200.

The optical pickup 200 may include an optical system and circuit system having various configurations and a mechanical system mechanically supporting the optical system and performing focusing and tracking operations. The optical system and circuit system may include an encoder/decoder and may be connected to a signal processor 300 connected to an interface 500 to be connected to an external host, and the mechanical system may be connected to a servo unit 400. The optical pickup 200 and the signal processor 300 may include the various examples described with reference to FIGS. 1 to 3.

The signal processor 300, the servo unit 400, and the interface 500 may be controlled by the controller 600, i.e., a central controller. The interface 500 conforms to various standards and, for example, includes a Universal Serial Bus (USB) port, and in this case, the interface 500 transmits and receives information according to a USB protocol by being connected to the external host, e.g., a computer 700.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical information storage medium system comprising:
   an optical pickup, comprising a photo-detector configured to control light power detected by receiving a portion of light emitted from a light source and configured to provide an output signal proportional to a light power of the light source from a signal detected by the photo-detector; and
   a signal processor configured to signal-process the output signal from the optical pickup,
   wherein the signal processor comprises:
      a sensitivity acquirer configured to acquire a sensitivity value of the photo detector;
      a gain calculator configured to calculate a target gain value by comparing the sensitivity value of the photo-detector with a target sensitivity value that is used by the optical information storage medium system; and
      a gain adjuster configured to adjust a gain of an output signal of the photo detector, which is input from the optical pickup, based on the target gain value, and
   wherein
      the signal processor is configured to generate an output signal in which the gain is reflected.

2. The optical information storage medium system of claim 1, wherein the optical pickup further comprises a sensitivity recorder in which a value obtained by pre-measuring sensitivity of the photo-detector is recorded, and
   the sensitivity acquirer acquires the sensitivity value of the photo-detector from information provided by the sensitivity recorder.

3. The optical information storage medium system of claim 2, wherein, in the sensitivity recorder, the sensitivity value of the photo-detector is recorded as barcode data.

4. The optical information storage medium system of claim 3, wherein the sensitivity acquirer acquires the sensitivity value of the photo-detector based on the output signal from the optical pickup.

5. The optical information storage medium system of claim 4, wherein the signal processor is implemented with a digital signal processor.

6. The optical information storage medium system of claim 3, wherein the barcode data is pre-measured using an optical power meter.

7. The optical information storage medium system of claim 1, wherein the sensitivity acquirer acquires the sensitivity value of the photo-detector by using the output signal from the optical pickup.

8. The optical information storage medium system of claim 7, wherein the signal processor is implemented with a digital signal processor.

9. The optical information storage medium system of claim 1, wherein the light power detected by the photo-detector is output as an output signal of the optical pickup by using a fixed resistor configured to set the sensitivity of the photo-detector.

10. The optical information storage medium system of claim 9, wherein the signal processor is implemented with a digital signal processor.

11. The optical information storage medium system of claim 1, wherein the signal processor is implemented with a digital signal processor.

12. An optical information storage medium system comprising:
   an optical pickup, comprising a photo-detector configured to control light power detected by receiving a portion of light emitted from a light source and configured to provide an output signal proportional to a light power of the light source from a signal detected by the photo-detector and a sensitivity recording unit in which a value obtained by pre-measuring sensitivity of the photo-detector is recorded; and a signal processor configured to signal-process the output signal input from the optical pickup, wherein the signal detected by the photo-detector is output as an output signal of the optical pickup by using a fixed resistor for setting the sensitivity of the photo-detector, and wherein the signal processor comprises:
- a sensitivity acquirer configured to acquire a sensitivity value of the photo-detector from information provided by the sensitivity recording unit;
- a gain calculator configured to calculate a target gain value by comparing the sensitivity value of the photo-detector with a target sensitivity value that is used by the optical information storage medium system; and
- a gain adjuster configured to adjust a gain of an output signal of the photo detector, which is input from the optical pickup, based on the target gain value, and wherein the signal processor generates an output signal in which the gain is reflected.

13. The optical information storage medium system of claim 12, wherein the signal processor is implemented with a digital signal processor.

14. A method of generating a signal for controlling light power, the method comprising:
providing an output signal proportional to a light power of a light source from a signal detected by a photo-detector in an optical pickup, which comprises a photo-detector configured to control light power detected by receiving a portion of light emitted from the light source in order to generate the signal to control the light power in an optical information storage medium system comprising the optical pickup and a signal processor;

acquiring a sensitivity value of the photo-detector;

calculating a target gain value by comparing the acquired sensitivity value of the photo-detector with a target sensitivity value that is used by the optical information storage medium system; and generating an output signal for a light power control in which the gain is reflected by adjusting a gain of an output signal of the photo-detector, which is input from the optical pickup, by using the target gain value, wherein the signal processor is configured to perform the acquiring of the sensitivity value, the calculating of the target gain value, and the generating of the output signal for a light power control in which the gain is reflected.

15. The method of claim 14, wherein a value obtained by pre-measuring sensitivity of the photo-detector is recorded in the optical pickup, and
the sensitivity value of the photo-detector is acquired from the value obtained by pre-measuring the sensitivity of the photo-detector.

16. The method of claim 15, wherein the signal processor is implemented with a digital signal processor.

17. The method of claim 14, wherein the sensitivity value of the photo-detector is acquired based on the output signal from the optical pickup.

18. The method of claim 14, wherein the signal detected by the photo-detector is output as an output signal of the optical pickup by using a fixed resistor configured to set the sensitivity of the photo-detector.

19. The method of claim 18, wherein the signal processor is implemented with a digital signal processor.

20. The method of claim 14, wherein the signal processor is implemented with a digital signal processor.

* * * * *